No. 813,475. PATENTED FEB. 27, 1906.
A. B. WILSON.
CAR FENDER.
APPLICATION FILED AUG. 29, 1905.

2 SHEETS—SHEET 1.

Witnesses:
Chas. D. King
Adolph F. Dinse

Inventor:
Albert B. Wilson
by Theodore Long
Atty.

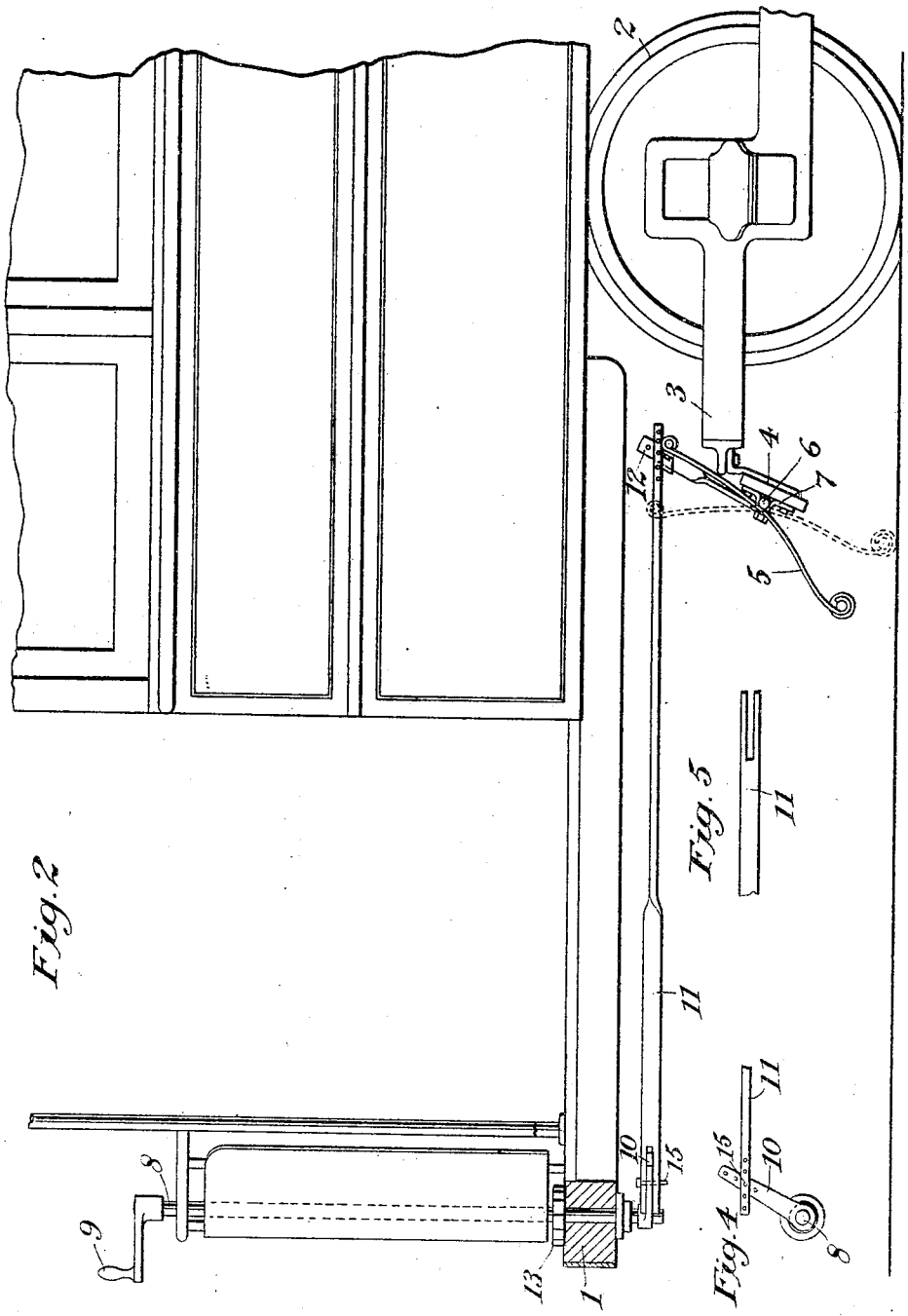

UNITED STATES PATENT OFFICE.

ALBERT B. WILSON, OF NEW YORK, N. Y., ASSIGNOR OF ONE-FOURTH TO JOSEPH M. LESSER, OF NEW YORK, N. Y.

CAR-FENDER.

No. 813,475.     Specification of Letters Patent.     Patented Feb. 27, 1906.

Application filed August 29, 1905. Serial No. 276,193.

*To all whom it may concern:*

Be it known that I, ALBERT B. WILSON, a citizen of the United States, residing in the city, county, and State of New York, have invented certain new and useful Improvements in Car-Fenders, of which the following is a full, clear, and exact specification.

My invention relates to certain new and useful improvements in fenders for railway-cars and the like; and it consists of the combinations and parts hereinafter more particularly described and claimed. In devices of this character it is very desirable that the fender proper be so located as to be entirely free from liability of contact with the ground when it is not required to perform its desired functions. For this reason a movable fender member is desirable, which will be normally a sufficient distance from the ground to prevent accidental contact therewith, but which can readily be brought into a position to pick up any obstruction or person upon the track and absolutely prevent their being caught under the wheels. Owing to the oscillation of the spring-supported car-body upon the trucks, especially when running at high speed, it has been found difficult to assure these requirements when the fender member is secured to the body of the car, but, on the other hand, it is necessary that means be supplied, easily accessible to the car operator, for bringing the fender member into its operative position should the necessity for its use arise, and means are also desirable for maintaining the parts in this adjusted position to assure their successful operation.

My invention by reason of its construction, as hereinafter pointed out, will be found to meet all of the foregoing requirements and to afford an efficient and reliable device for the purposes specified.

Figure 1:
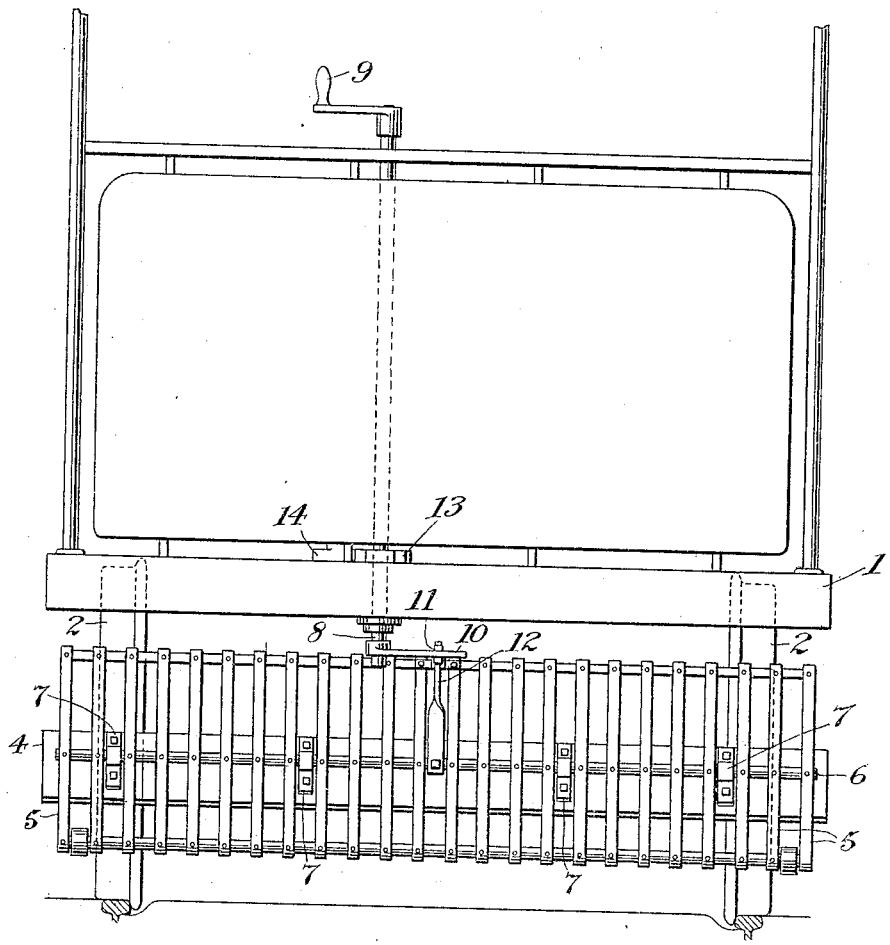
Figure 3:
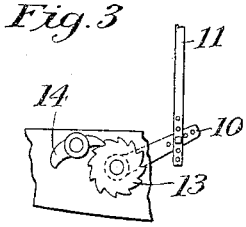

In the drawings illustrating one form of my invention, Figure 1 is a front elevation of my invention and shows so much of a car as is necessary to completely understand the same. Fig. 2 is a side elevation of the same parts, and Fig. 3 is a detailed fragmentary view of the pawl and ratchet used for maintaining the device in its adjusted position. Figs. 4 and 5 are fragmentary views of the connecting means between the operating-lever and the fender member.

In the drawings, 1 indicates the frame of the car-body, which may be of any desired construction.

2 indicates one of the wheels of the truck, and 3 the forward brace of the truck proper.

The car-body is spring-supported upon the truck in any well-known manner and need not be especially described herein.

To the brace 3 is secured a depending flange 4, to which is pivotally secured the fender proper or fender member 5, a pivot or shaft 6 being secured in suitable bearings 7 on said depending flange, by means of which the said fender member 5 is permitted to rotate slightly about its center. By suspending the fender 5 centrally, as shown, the part will be practically balanced and will thus be readily operative without requiring any considerable amount of effort on the part of the motorman or driver. Furthermore, the fender is practically automatic, for in case it comes in contact with any obstacle on the track it tips into operative position without the necessity of the motorman's throwing the operating-lever.

Upon the car-body is mounted in suitable journals in any well-known manner the operating-shaft 8, having a handle or lever 9 at its upper end and a finger or arm 10 rigidly secured to its lower end, and a connecting link or rod 11 is pivotally secured at one end to the arm 10 and at the other end to an arm 12, rigidly secured to the fender member 5, so that any rotation of the handle or lever 9 will operate to tilt the fender into or out of opertive position, according to the direction of rotion. Rigidly secured to the operating-shaft 8 is mounted the ratchet-wheel 13, and a pawl 14, pivoted adjacent thereto and coöperating therewith, prevents the rotation of the rod or shaft in a direction which will lift the fender away from the ground, and thus serves to retain it in its operative position when moved into said position. The connection between the link 11 and the arms 10 and 12 may be of any desired character; but I prefer to employ pivotal connections, which in the drawings consist of a series of holes, any two of which may be made to register, and a bolt 15, passed therethrough, as by this means any desirable adjustments may be made. I also prefer to bifurcate the ends of the link 11, so as to more positively assure engagement between the parts.

It is obvious that many modifications may be made in my device than the specific form shown without departing from the spirit of my invention, and I do not wish to limit myself to the exact construction shown; but

What I claim, and desire to secure by Letters Patent, is—

1. In a fender for railway-cars, the combination of a wheeled truck, a fender member pivotally connected thereto, a car-body over said truck and means independent of the brake-staff on said car-body extending above the platform, adapted to be controlled by the operator and connected to the fender member for positively moving said member into operative position, substantially as described.

2. In a fender for railway-cars, the combination of a wheeled truck, a fender member pivotally connected thereto, a car-body over said truck, means independent of the brake-staff on said car-body extending above the platform, adapted to be controlled by the operator and connected to the fender member for positively moving said member into operative position, and means for retaining said member in said operative position, substantially as described.

3. In a fender for railway-cars, the combination of a wheeled truck, a fender member pivotally connected at its center thereto, a car-body above said truck and means independent of the brake-staff on said body extending above the platform, adapted to be controlled by the operator and adjustably connected to the fender member for positively moving said member into operative position, substantially as described.

4. In a fender for railway-cars, the combination of a wheeled truck, a fender member pivotally connected at its center thereto, a car-body above said truck, means independent of the brake-staff on said body extending above the platform, adapted to be controlled by the operator and adjustably connected to the fender member for positively moving said member into operative position and means for retaining said member in said operative position, substantially as described.

5. In a fender for railway-cars, the combination of a wheeled truck, a fender member pivotally connected thereto, a car-body above said truck, a rotating hand-lever on said car-body, and a rigid connecting-link between said lever and said fender member for positively moving said member into either an operative or an inoperative position, substantially as described.

6. In a fender for railway-cars, the combination of a wheeled truck, a fender member pivotally connected thereto, a car-body above said truck, a rotating hand-lever on said car-body, a rigid connecting-link between said lever and said fender member for positively moving said member into either an operative or an inoperative position, and means for retaining said lever and fender member in operative position, substantially as described.

7. In a fender for railway-cars, the combination of a wheeled truck, a fender member pivotally connected at its center to said truck, a car-body above said truck, a rotating hand-lever upon said body independent of the brake-staff and an adjustable rigid link connection between said lever and said fender for positively moving said fender into operative position, substantially as described.

8. In a fender for railway-cars, the combination of a wheeled truck, a fender member pivotally connected at its center to said truck, a car-body above said truck a rotating hand-lever upon said car-body, an adjustable rigid link connection between said lever and said fender for positively moving said member into either an operative or an inoperative position, and a pawl-and-ratchet device for retaining said lever and fender member in said operative position, substantially as described.

9. In a fender for railway-cars, the combination of a wheeled truck, a fender member connected to said truck and arranged so as to be moved into operative position upon contact with an obstacle, a car-body over said truck and independent means on said car-body controlled by the operator and rigidly connected to the fender member for positively moving said member into operative position, substantially as described.

10. In a fender for railway-cars, the combination of a wheeled truck, a fender member connected to said truck and arranged so as to be moved into operative position upon contact with an obstacle, a car-body over said truck, independent means on said car-body controlled by the operator and rigidly connected to the fender member for positively moving said member into operative position, and means for retaining said member in said operative position, substantially as described.

In testimony whereof I have hereunto set my hand in the presence of two subscribing witnesses.

ALBERT B. WILSON.

Witnesses:
  E. DANIEL MINER,
  ERNEST H. FLINCHARD.